United States Patent
Rajahalme

(10) Patent No.: US 7,447,156 B2
(45) Date of Patent: Nov. 4, 2008

(54) MECHANISM FOR MULTICAST DELIVERY IN COMMUNICATIONS SYSTEMS

(75) Inventor: Jarno Rajahalme, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 907 days.

(21) Appl. No.: 10/179,009

(22) Filed: Jun. 26, 2002

(65) Prior Publication Data

US 2003/0007499 A1    Jan. 9, 2003

(30) Foreign Application Priority Data

Jun. 28, 2001  (FI)  ................................. 20011392

(51) Int. Cl.
*G08C 17/00* (2006.01)
(52) U.S. Cl. ..................... 370/238; 370/329; 370/432; 370/437; 370/465; 455/445; 709/239
(58) Field of Classification Search ................ 370/311, 370/329, 332, 333, 432, 437, 464, 465, 479, 370/238, 45; 455/405, 450, 503, 518, 519, 455/500, 507, 517, 445; 709/239
See application file for complete search history.

(56) References Cited

U.S. PATENT DOCUMENTS

| | | | | |
|---|---|---|---|---|
| 5,930,248 | A * | 7/1999 | Langlet et al. | 370/347 |
| 6,011,977 | A * | 1/2000 | Brown et al. | 455/503 |
| 6,473,405 | B2 * | 10/2002 | Ricciulli | 370/238 |
| 6,707,801 | B2 * | 3/2004 | Hsu | 370/312 |
| 6,760,774 | B1 * | 7/2004 | Soumiya et al. | 709/233 |
| 7,002,934 | B2 * | 2/2006 | Dolgonos et al. | 370/328 |
| 7,042,846 | B2 * | 5/2006 | Bauer | 370/238 |

(Continued)

FOREIGN PATENT DOCUMENTS

EP    1 006 740 A2    6/2000

(Continued)

OTHER PUBLICATIONS

Wieselthier, Nguyen, and Ephremides, "On the Construction of Energy-Efficient Broadcast and Multicast Trees in Wireless Networks", IEEE INFOCOM 2000, Mar. 26-30, 2000, p. 585-594.*

(Continued)

*Primary Examiner*—Hassan Kizou
*Assistant Examiner*—Brian T. O'Connor
(74) *Attorney, Agent, or Firm*—Pillsbury Winthrop Shaw Pittman LLP

(57) ABSTRACT

A method minimizes use of radio spectrum in communication delivery, where a multicast data packet is sent to at least one multicast group member via a radio access router controlling radio resources. The router determines a first cost of delivery of the multicast data packet as a multicast delivery to each active multicast group member and determines and compares the costs of a cell broadcast delivery and a delivery using dedicated channels. Based on the comparison, multicast packet delivery uses the cheapest applicable of the following delivery methods i) multicast data packet transmission to each active member of the multicast group using dedicated channel(s), ii) multicast data packet transmission to each active member of the multicast group using cell broadcast channel, or iii) multicast data packet transmission to some of the multicast group members using cell broadcast channel and to some of the group members using dedicated channels.

9 Claims, 2 Drawing Sheets

U.S. PATENT DOCUMENTS

| | | | |
|---|---|---|---|
| 7,283,782 B2* | 10/2007 | Sinnarajah et al. | 455/3.01 |
| 7,355,980 B2* | 4/2008 | Bauer et al. | 370/238 |
| 2001/0005368 A1* | 6/2001 | Rune | 370/390 |

FOREIGN PATENT DOCUMENTS

| WO | WO 98/25422 | 6/1998 |
|---|---|---|
| WO | WO 99/16277 A2 | 4/1999 |

OTHER PUBLICATIONS

Russell J. Clark et al., "Providing scalable Web services using multicast communication", Computer Networks and ISDN Systems, Elsevier Science B.V., pp. 841-858, (Aug. 1, 1997).

* cited by examiner though it may not be the cheapest alternative, it may be the cheapest or most

MECHANISM FOR MULTICAST DELIVERY IN COMMUNICATIONS SYSTEMS

This U.S. non-provisional application relies for priority upon Finnish Patent Application No. 20011392, filed on Jun. 28, 2001.

FIELD OF THE INVENTION

The invention relates to communications systems, and more particularly to mechanisms for multicast delivery optimizing radio resource usage.

BACKGROUND OF THE INVENTION

Existing methods for multicast delivery—i.e. the delivery where transmission of a single protocol data unit (PDU) reaches a group of one or more destinations—over radio interfaces use broadcasting on the radio link to reach unidirectionally all recipients covered by the cell, e.g. to reach all mobile stations which are located in the area of one base station. The delivery of a communication message may be for example a weather forecast, a traffic announcement or an advertisement.

Broadcasting to the whole cell area uses a lot of power, which in turn causes a lot of cross-channel interference. Also, a robust channel coding is usually required to reach the full coverage area of the cell, especially because there is usually no feedback possibility for the receivers to indicate lost radio frames.

On the other hand, in situations where there is only one, or a few recipients on the cell area, it would be cheaper and more resource-efficient to send the information to the recipients individually using dedicated channels. Unicasting transmission may be described as a transmission of a single protocol data unit PDU to a single destination.

However, other radio systems carry all user plane data traffic on dedicated channels. Such systems waste radio resources, if the same information is being sent separately to many users on the cell area. Also, when the number of group members on the cell area is larger than the number of available dedicated channels, all users cannot be served.

One of the disadvantages associated with the above-mentioned arrangements is thus that shared channel based systems waste radio spectrum, if the number of group members is low on the cell area while dedicated channel based systems waste radio spectrum, if the number of group members is high on the cell area.

BRIEF DISCLOSURE OF THE INVENTION

It is thus an object of the present invention to provide a new method and an apparatus for implementing the method so as to overcome the above problem. The objects of the invention are achieved by methods and routers, which are characterized by what is stated in the independent claims. The preferred embodiments of the invention are disclosed in the dependent claims.

The invention is based on the idea of delivering group communication either by dedicated or by shared radio channels, or by a combination thereof based on the information of layer 2 and layer 3 of the radio network. The invention is also based on the premise that the membership of the group communication is known when allocating radio resources for the group communication delivery.

An advantage of the method and arrangement of the invention is a radio resource optimized multicast delivery.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
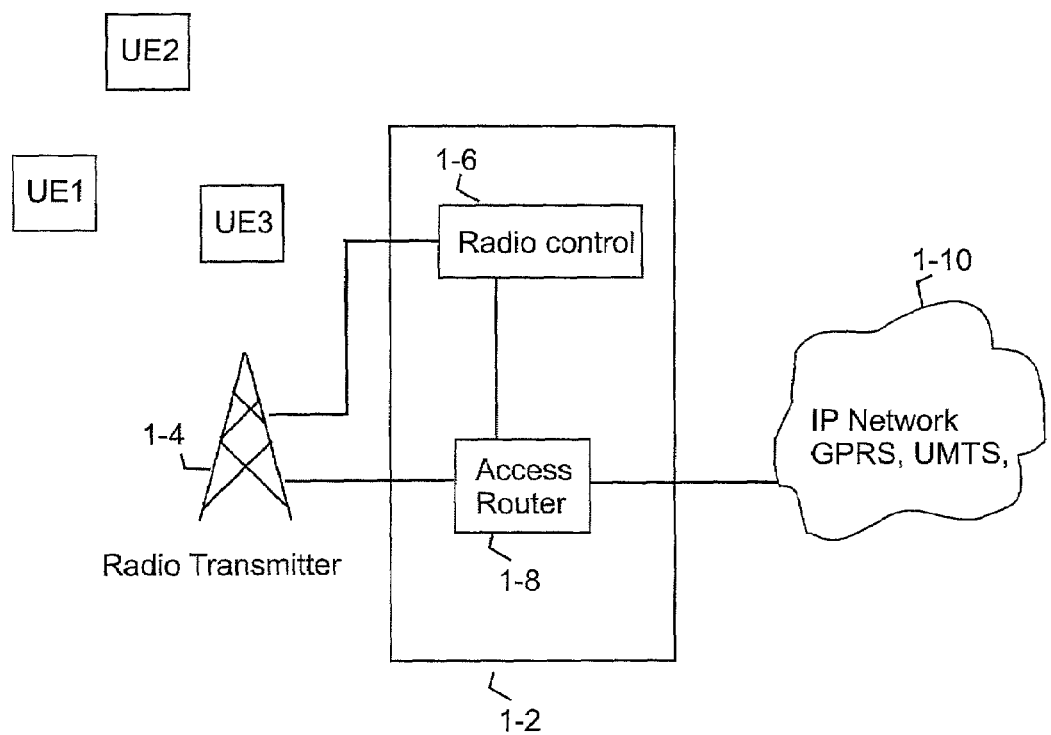
FIG. 1 illustrates a system architecture of a communications system in accordance with the principles of the present invention.

FIG. 1 illustrates a logical architecture of a communications system in accordance with the principles of the present invention. The network architecture comprises a radio access router 1-2 to which a radio transmitter 1-4, e.g. in a base station, is connected. The radio access router comprises a radio control element 1-6 and an access router element 1-8. The radio control element is on the layer 2, on the link layer. The element provides the management of radio resources for subscribers, for recipients UE1 (User Equipment), UE2 and UE3. The element has the information of e.g. radio distances from antennas of recipients, who is on the area of a cell and what power is required for the transmitter to send data to recipients. The access router element may be defined as an access server that provides mobile connections to data networks and corporate local area networks. The access router is an IP (Internet Protocol) layer element on the layer 3 providing a subscriber interface for a subscriber.

Different networks 1-10 that support multicast function may be connected to the radio access router. These networks may include networks like a TETRA (TErrestrial Trunked Radio) network, a GPRS (General Packet Radio Service) network, an UMTS (Universal Mobile Telecommunications System) network and an IP (Internet Protocol) network. Regarding the invention, the operation and structure of these packet switched networks are described only to a degree that will assist in comprehending the reduction of the radio resource usage according to the invention and its embodiments.

Figure 2:
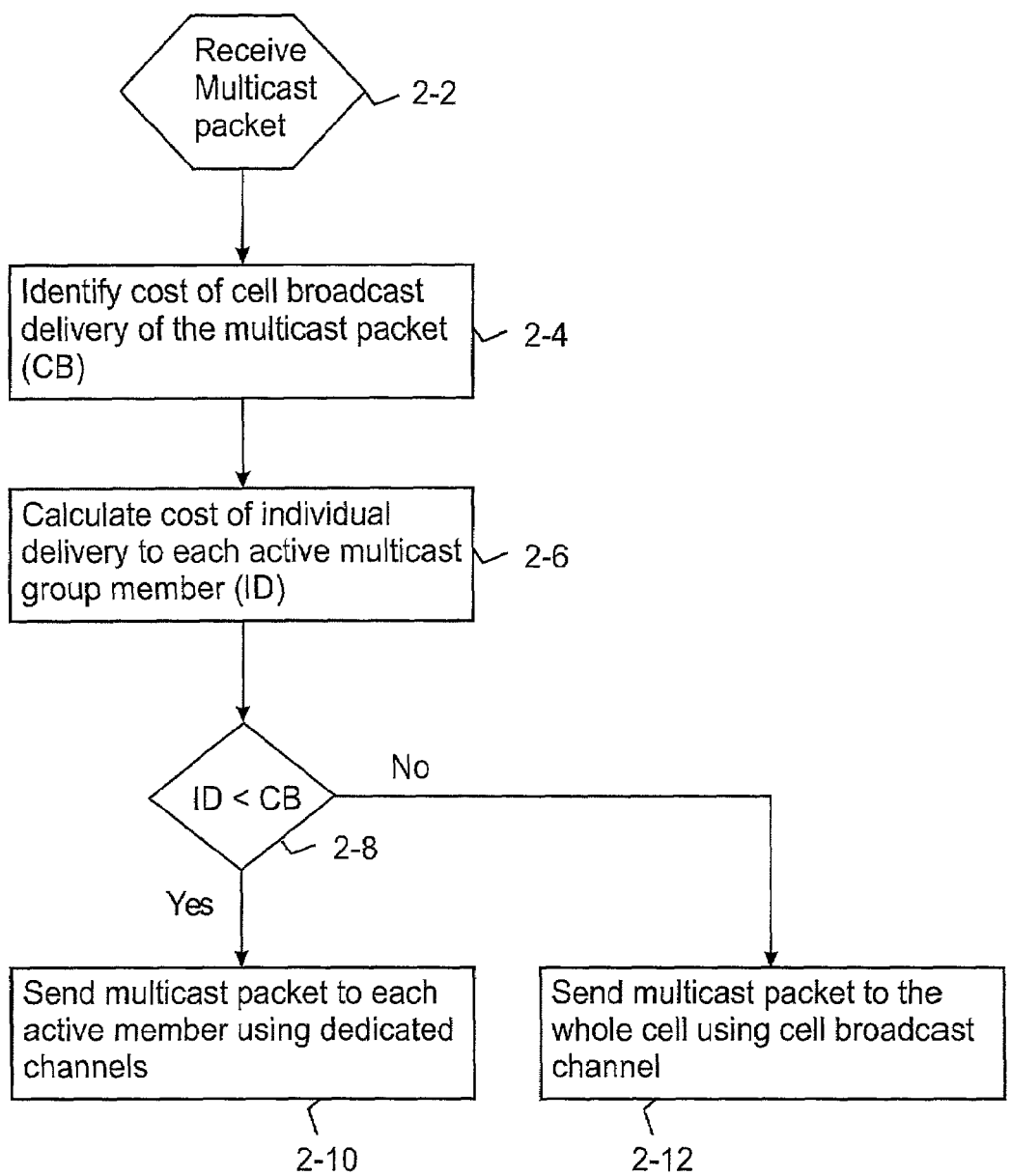
FIG. 2 shows a flow chart of a decision process.

FIG. 2 shows a flow chart of a decision process according to the invention. In it costs of different methods, either the use of dedicated or the use of shared radio channels, or the use of a combination thereof, for sending multicast packets are calculated. In step 2-2 the access router receives a multicast packet. In order to choose an optimum communication method in terms of radio resource usage, cost calculations are proceeded. These calculations may comprise calculations in function of e.g. the radio distance of the recipients covered by the cell and/or the signal strength needed to reach recipients and/or mobile station specific group membership information.

In step 2-4 the router identifies a cost of cell broadcast delivery of the multicast packet. This cost can be denoted as CB. In step 2-6 the router identifies a cost of individual delivery to each active multicast group member. This cost can be denoted as ID.

After these steps in step 2-8 the two above-mentioned costs are compared. If it would be cheaper to send multicast packet to each active member using dedicated channels, this is done is step 2-10. If the broadcast delivery is cheaper, the multicast packet is sent to the whole cell using cell broadcast channel method. In another embodiment of the invention, one further alternative to deliver the multicast packet is to send the packet to some of the multicast group members using cell broadcast channel and to some of the group members using dedicated channels. The latter alternative may be the cheapest or most suitable in a case, for example, in which the broadcast would be cheapest way to deliver the multicast packet but some (>0) of the group members are not able to receive the broadcast for one reason or another. In other words, the multicast group is handled as subgroups to which the multicast packet is delivered using different methods.

When a frame, a datagram, or a packet needs to be delivered to the group, the radio access router finds out the number of group members on the covered area, and the positions (radio-wise) of each member. Based on this information, i.e. the information of the radio control element and the access router element the radio access router will make a decision on what kind of links or radio bearers to use to deliver the information with sufficient accuracy e.g. bit error rate, while minimizing the use of radio resources for that delivery.

Additionally to finding out the optimum way to make multicast delivery, the membership of the group communication is to be known when radio resources are allocated for the group communication delivery. For IP based group communications this means that the IP multicasting group membership information should be available at the entity in the radio network, which manages the radio resources. In other cellular networks this is not the case, since the radio resource management is managed in the radio access network RAN, while the multicasting group membership can be known only outside of the radio access network. When the network layer, i.e. the IP layer, service is provided by the radio access network itself, it becomes possible to consider IP multicasting group membership information when managing radio resources for the group communication delivery.

The invention can be implemented in a variety of ways. The first router in the radio access network may maintain terminal-specific group membership information, for example based on the IP layer group membership protocols. Examples of the protocols are IGMP (Internet Group Management Protocol), which is used by IP hosts to report their multicast group memberships to an adjacent multicast router for Internet Protocol version 4 (IPv4) and MLD (Multicast Listener Discovery) for Internet Protocol version 6 (IPv6).

The group communications service could also be provided on the layer 2, and the group membership information could become available to the radio access network even without IP layer being integrated into the radio access network.

By utilising the user equipment specific radio information, e.g. signal strength, and user equipment specific group membership information, the radio access network can determine the most optimal way of radio resource usage, of multicasting information delivery to the group members on the cell area. The choices comprise using dedicated channels for small number of group members on the cell area, and shared channel for larger number of group members on the cell area, or a combination thereof.

One advantage of the method of the invention and its embodiments is that the method minimizes the amount of radio spectrum to be used for unlimited number of group members covered by the same cell. Thus in situations where the number of group members on the cell area is larger than the number of available dedicated channels or there is just few users on the cell area, radio resources may be saved. If there were only one member on the cell area, no more radio spectrum is being used because of group communications service. The method of the invention and its embodiments also minimizes cross-channel interference, consumes less power, and allows the usage of more effective channel coding when there is no feedback possibility for the receivers to indicate lost radio frames on broadcast.

It will be obvious to a person skilled in the art that, as the technology advances, the inventive concept can be implemented in various ways. The invention and its embodiments are not limited to the examples described above but may vary within the scope of the claims.

The invention claimed is:

1. A method of delivering a multicast data packet to at least one multicast group member via a radio access router controlling radio resources in a communications system, the method comprising receiving a multicast data packet to be delivered to at least one recipient in a multicast group;

determining a first cost of delivery of the multicast data packet as a multicast delivery to each active recipient member of said multicast group;

determining a second cost of delivery of the multicast data packet as an individual delivery to each active recipient member of said multicast group;

comparing the first and the second costs; and on the basis of the comparison result, delivering, via the radio access router, the multicast data packet using the cheapest applicable one of a predetermined set of delivery methods, said predetermined set of delivery methods comprising:

a) if the first cost is more than the second cost, sending the multicast data packet to each active member of the multicast group using one or more dedicated channels; otherwise b) sending the multicast data packet to each active member of the multicast group using cell broadcast channel if the second cost is more than the first cost.

2. A method according to claim 1, wherein said determining of costs comprise calculating the costs based on one or more of the following parameters: the radio distance of the recipient(s), the signal strength from recipient(s) to the radio access router, and group membership information of recipient(s).

3. A method according to any one of claims 1 or 2, comprising controlling the cell broadcast delivery depending on the radio distance of the recipient(s).

4. A method according to claim 3, wherein said controlling comprises optimising of the transmission power used in the cell broadcast delivery.

5. The method of claim 1, wherein said predetermined set of delivery methods further comprises: c) sending the multicast data packet to some of the multicast group members using cell broadcast channel and to some of the group members using dedicated channels.

6. A method of delivering a multicast data packet to at least one multicast group member in a communications system, comprising providing a multicast data packet to be delivered to at least one member in a multicast group;

determining a first cost of delivery of the multicast data packet as a multicast delivery to each active recipient member in the multicast group;

determining a second cost of delivery of the multicast data packet as an individual delivery to each active recipient member in the multicast group member;

comparing the first and the second costs; and on the basis of the comparison result, delivering the multicast packet using the cheapest applicable one of the following delivery methods i) sending the multicast data packet to each active recipient member of the multicast group using dedicated channel(s), ii) sending the multicast data packet to each active recipient member of the multicast group using cell broadcast channel, or iii)

sending the multicast data packet to some of the multicast group members using cell broadcast channel and to some of the group members using dedicated channels.

7. A radio access router for a communications system, comprising:
   a radio control element; and
   an access router, wherein
   the radio control element is configured to receive the multicast data packet to be delivered to at least one recipient member in a multicast group;
   the access router is configured to determine a first cost of delivery of the multicast data packet as a multicast delivery to each active recipient member in the multicast group;
   the access router is configured to determine a second cost of delivery of the multicast data packet as an individual delivery to each active recipient member in the multicast group;
   the access router is configured to compare the first and the second costs; and
   the radio control element is configured to be responsive to a result of comparison result to deliver the multicast packet using the cheapest applicable one of the following delivery methods:
   i) sending the multicast data packet to each active recipient member of the multicast group using dedicated channel(s),
   ii) sending the multicast data packet to each active recipient member of the multicast group using cell broadcast channel, or
   iii) sending the multicast data packet to some of the multicast group members using cell broadcast channel and to some of the group members using dedicated channels.

8. A radio access router for delivering a multicast data packet to at least one multicast group member via a communications system, the radio access router comprising:
   a radio control element, wherein the radio control element is configured to receive a multicast data packet to be delivered to at least one recipient in a multicast group;
   an access router, wherein the access router is configured to:
   determine a first cost of delivery of the multicast data packet as a multicast delivery to each active recipient member in a multicast group member;
   determine a second cost of delivery of the multicast data packet as an individual delivery to each active recipient member in the multicast group;
   compare the first and the second costs; and
   wherein the radio control element is configured to deliver, on the basis of a comparison result, the multicast data packet using the cheapest applicable one of a predetermined set of delivery methods, said predetermined set of delivery methods comprising:
   a) if the first cost is more than the second cost, the router is configured to send the multicast data packet to each active recipient member of the multicast group using one or more dedicated channels;
   b) if the second cost is more than the first cost otherwise the router is configured to send the multicast data packet to each active recipient member of the multicast group using cell broadcast channel.

9. The radio access router of claim 8, wherein the radio control element is configured to deliver the multicast data packet using the cheapest applicable one of a predetermined set of delivery methods, said predetermined set of delivery methods further comprising: c) sending the multicast data packet to some of the multicast group members using cell broadcast channel and to some of the group members using dedicated channels.

* * * * *